US012753746B2

(12) United States Patent
Chady et al.

(10) Patent No.: US 12,753,746 B2
(45) **Date of Patent: *Oct. 6, 2026**

(54) LONG STROKE PARALLEL PUMP

(71) Applicant: NATIONAL OILWELL VARCO, L.P., Houston, TX (US)

(72) Inventors: Kyle Christopher Chady, Broken Arrow, OK (US); James Sterling Evans, Owasso, OK (US); Travis Lee Bolt, Travis, TX (US); Shriram Pushparaj Patil, Richmond, TX (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 46 days.

This patent is subject to a terminal disclaimer.

(21) Appl. No.: 18/347,325

(22) Filed: Jul. 5, 2023

(65) Prior Publication Data

US 2023/0407854 A1 Dec. 21, 2023

Related U.S. Application Data

(63) Continuation-in-part of application No. 17/807,066, filed on Jun. 15, 2022.

(51) Int. Cl.

*F04B 9/02* (2006.01)
*F04B 23/06* (2006.01)

(Continued)

(52) U.S. Cl.

CPC ................ *F04B 9/02* (2013.01); *F04B 23/06* (2013.01); *F04B 53/144* (2013.01); *F16H 21/16* (2013.01); *F16H 57/038* (2013.01)

(58) Field of Classification Search

CPC ...... F04B 1/0404; F04B 1/053; F04B 1/0536; F04B 1/0538; F04B 9/02; F04B 23/06;

(Continued)

(56) References Cited

U.S. PATENT DOCUMENTS 587,525 A * 8/1897 Name not available .................... F04B 47/026 74/51
1,438,493 A * 12/1922 Johnson .................. F04B 9/025 74/52

(Continued)

FOREIGN PATENT DOCUMENTS

CN 1699731 11/2005
CN 203548106 4/2014

(Continued)

OTHER PUBLICATIONS

"U.S. Appl. No. 17/807,066, Non Final Office Action mailed May 28, 2024", 28 pgs.

(Continued)

*Primary Examiner* — Charles G Freay
*Assistant Examiner* — Joseph S. Herrmann
(74) *Attorney, Agent, or Firm* — Schwegman Lundberg & Woessner, P.A.

(57) ABSTRACT

A pump system may include a drive shaft extending along a longitudinal axis and supplying rotation about the longitudinal axis, a gear system operably coupled to the shaft for changing the orientation of the rotation, and a slider-crank mechanism. The slider crank mechanism may include a rotating member assembly mechanically coupled to and driven by the gear system. The rotating member assembly may include a plurality of rotating members having respective rotational axes offset laterally from one another and generally orthogonal to the longitudinal axis. The slider crank mechanism may also include a sliding member assembly mechanically coupled to the rotating member assembly. The rotating member assembly may be configured to drive reciprocating motion of the sliding member to alternately draw fluid in and discharge fluid. The slider crank mecha- (Continued)

nism may also include a connecting rod assembly mechanically coupling the rotating member assembly to the sliding member assembly.

20 Claims, 12 Drawing Sheets

(51) Int. Cl.

| | |
|---|---|
| ***F04B 53/14*** | (2006.01) |
| ***F16H 21/16*** | (2006.01) |
| ***F16H 57/038*** | (2012.01) |

(58) Field of Classification Search

CPC ........ F04B 53/14; F04B 53/144; F16H 21/16; F16H 57/038; Y10T 74/18264

USPC .................................................... 74/22 A, 51

See application file for complete search history.

(56) References Cited

U.S. PATENT DOCUMENTS

| | | | | | |
|---|---|---|---|---|---|
| 1,770,683 | A * | 7/1930 | Davis | F16H 21/16 137/902 |
| 2,032,000 | A | 2/1936 | Brown et al. | |
| 2,073,623 | A | 3/1937 | Brown et al. | |
| 2,187,679 | A * | 1/1940 | Chambers | F04B 1/00 417/419 |
| 3,583,252 | A * | 6/1971 | Shipitalo | F16H 1/48 475/346 |
| 3,641,828 | A | 2/1972 | Ryan | |
| 4,261,228 | A | 4/1981 | Eagan, Sr. | |
| 4,830,589 | A | 5/1989 | Pareja | |
| 4,907,650 | A | 3/1990 | Heinonen | |
| 4,975,025 | A * | 12/1990 | Yamamura | F04B 1/0413 92/61 |
| 6,086,339 | A | 7/2000 | Jeffrey | |
| 6,171,070 | B1 | 1/2001 | Mitake | |
| 6,231,321 | B1 | 5/2001 | Fukudome et al. | |
| 6,742,441 | B1 | 6/2004 | Surjaatmadja et al. | |
| 8,662,865 | B2 | 3/2014 | Bayyouk et al. | |
| 2002/0056365 | A1 | 5/2002 | Jones | |
| 2002/0121152 | A1* | 9/2002 | White | F16H 55/18 74/409 |
| 2007/0041849 | A1* | 2/2007 | Allen | F04B 49/126 417/273 |
| 2010/0242649 | A1* | 9/2010 | Vandewal | F16H 55/18 74/409 |
| 2014/0123813 | A1 | 5/2014 | Leung | |
| 2017/0045135 | A1* | 2/2017 | Kiesenbauer | F16H 1/14 |
| 2018/0313351 | A1 | 11/2018 | Dyer et al. | |
| 2023/0407856 | A1* | 12/2023 | Bolt | F04B 1/053 |

FOREIGN PATENT DOCUMENTS

| | | | | |
|---|---|---|---|---|
| CN | 216894784 U | * | 7/2022 | |
| TW | 1230231 B | * | 4/2005 | F16H 57/033 |
| WO | 2023245054 | | 12/2023 | |

OTHER PUBLICATIONS

"American Heritage dictionary—definition of the word", (2017), 2 pgs.

"U.S. Appl. No. 17/807,066, Response filed Aug. 27, 2024 to Non Final Office Action mailed May 28, 2024", 11 pgs.

"International Application Serial No. PCT US2023 068427, International Preliminary Report on Patentability mailed Sep. 11, 2024", 10 pgs.

"U.S. Appl. No. 17/807,066, Preliminary Amendment File Jun. 14, 2023", 6 pgs.

"International Application Serial No. PCT US2023 068427, International Search Report mailed Sep. 8, 2023", 4 pgs.

"International Application Serial No. PCT US2023 068427, Written Opinion mailed Sep. 8, 2023", 10 pgs.

"U.S. Appl. No. 17/807,066, Restriction Requirement mailed Feb. 21, 2024", 10 pgs.

"U.S. Appl. No. 17/807,066, Response filed Apr. 9, 2024 to Restriction Requirement mailed Feb. 21, 2024", 6 pgs.

"U.S. Appl. No. 17/807,066, Final Office Action mailed Dec. 31, 2024", 20 pgs.

"Canadian Application Serial No. 3,257,364, Voluntary Amendment Filed Jan. 22, 2025", 11 pgs.

"U.S. Appl. No. 17/807,066, Examiner Interview Summary mailed Feb. 10, 2025", 2 pgs.

"U.S. Appl. No. 17/807,066, Response filed Feb. 28, 2025 to Final Office Action mailed Dec. 31, 2024", 12 pgs.

"U.S. Appl. No. 17/807,066, Advisory Action mailed Mar. 14, 2025", 3 pgs.

"U.S. Appl. No. 17/807,066, Non Final Office Action mailed Apr. 9, 2025", 29 pgs.

"U.S. Appl. No. 17/807,066, Response filed Jul. 9, 2025 to Non Final Office Action mailed Apr. 9, 2025", 10 pgs.

"Canadian Application Serial No. 3,257,364, Examiners Rule 86(2) Report mailed Jun. 30, 2025", 12 pgs.

"Saudi Arabia Application Serial No. 1120246875, Substantive Examination Report mailed Sep. 18, 2025", w machine Translation, 4 pgs.

"Canadian Application Serial No. 3,257,364, Response filed Oct. 27, 2025 to Examiners Rule 862 Report mailed Jun. 30, 2025", 21 pgs.

"U.S. Appl. No. 17/807,066, Final Office Action mailed Nov. 4, 2025", 26 pgs.

"U.S. Appl. No. 17/807,066, Response filed Dec. 29, 2025 to Final Office Action mailed Nov. 4, 2025", 9 pgs.

"U.S. Appl. No. 17/807,066, Advisory Action mailed Jan. 7, 2026", 3 pgs.

"U.S. Appl. No. 17/807,066, Response filed Feb. 3, 2026 to Advisory Action mailed Jan. 7, 2026", 9 pgs.

* cited by examiner

LONG STROKE PARALLEL PUMP

CROSS-REFERENCE TO RELATED APPLICATIONS

The present application is a continuation-in-part and claims priority to U.S. patent application Ser. No. 17/807,066 entitled Long Stroke Parallel Pump and filed on Jun. 15, 2022, the content of which is hereby incorporated by reference herein in its entirety.

TECHNICAL FIELD

Embodiments described herein generally relate to devices and methods for a reciprocating fluid pump system. One specific example includes devices and methods for a triplex reciprocating fluid pump.

BACKGROUND

Positive displacement reciprocating pumps can be used for movement of fluid, such as petroleum, in a variety of overall systems in various applications in the oil and gas industry such as drilling or fracking. Such positive displacement reciprocating pumps can be single-cylinder or multiple-cylinder, having a single or multiple pistons, respectively. The fluid flow capacity of reciprocating pump depends on factors like plunger or piston area, stroke length, number of cylinders, and speed of the pump.

In many pumps, increasing a stroke length can be restricted using a crankshaft mechanism. In this case, as stroke length is increased, the diameter of the crankshaft will increase proportionally. This can result in higher cost of manufacturing for the crankshaft, increase in the pump height and weight. Alternatively, increasing a pump speed to change stroke length can increase the valve which can result in reduced service life of the pump, and an increased cost of replacing the valve and seats.

Additionally, many pumps take up a large volume and space because of the way in which various pump components are interconnected within the system.

SUMMARY OF THE DISCLOSURE

The present disclosure provides a method and system for a fluid pump, such as a positive displacement reciprocating pump. Such a pump can be used, for example, to pump fluid at a high pressure and constant flow for various applications, some of which may include drilling or fracking. The disclosed parallel pump can include a switch-back design that is space-saving. In the example pumps discussed herein, the rotating member assembly (e.g., a gear box) and sliding member assembly (e.g., pistons, plunger, or cylinders) can be situated beneath the driveshaft and prime mover (e.g., an engine). While the drive shaft and the prime mover can be situated on the same horizontal plane, the slider-crank assembly including the rotating member and sliding members assemblies can be on a parallel horizontal plane underneath the top components. This can allow for a switch-back type design.

The fluid flow capacity of a reciprocating pump depends on factors such as plunger or piston area, stroke length, number of cylinders, and the speed of the pump. For example, when the area and number of cylinders in the pump are kept constant, the flow rate can be increased by increasing either speed or stroke length.

Discussed herein is a long stroke parallel pump that can increase stroke length of a fluid pump without increasing the height of the pump or requiring a large crankshaft. This can help in preserving and lengthening the service life of the fluid end of the pump. For example, the fluid end of such a pump can include a valve and seat assembly, which can require replacement after certain operation. Additionally, this long stroke parallel pump can allow for increased volume of fluid per valve cycle.

The example long stroke parallel pump discussed herein can allow for a longer stroke than conventional pumps, such that a similar fluid flow can be achieved at a slower pump speed, which in turn can reduce wear and tear of the pump components.

The fluid pump described here can include a slider-crank mechanism that converts rotational motion of a crankshaft to lateral reciprocation movement of a plunger or piston. This reciprocation motion can create a suction phenomenon in a cylinder while traveling on one direction, and a discharge phenomenon while traveling in an opposing direction.

In an example, a fluid pump system can include: a prime mover with a shaft extending longitudinally; a gear box actuatable for reducing the prime mover rpm and increase torque to a predetermined value, wherein the prime mover is configured to drive the gear box, the gear box arranged longitudinally along the shaft; and a slider-crank mechanism offset laterally from the gear box and extending longitudinally parallel to the shaft, the slider-crank mechanism comprising: a rotating member assembly mechanically coupled to the gear box, the rotating member assembly comprising a plurality of rotating members, a sliding member assembly mechanically coupled to the rotating member assembly, wherein the rotating member assembly is configured to drive the sliding member assembly; and a connecting rod assembly mechanically coupling the rotating member assembly to the sliding member assembly.

In an example, a method can include producing rotational movement at a primer mover; transferring the rotational movement to a gear box and reducing speed of the rotational movement to a predetermined level; driving a plurality of bull gears with the reduced rotational movement via a plurality of corresponding pinions, producing linear movement in a plurality of sliding members each coupled to one of the plurality of bull gears; and suctioning and discharging the fluid with the linear movement.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
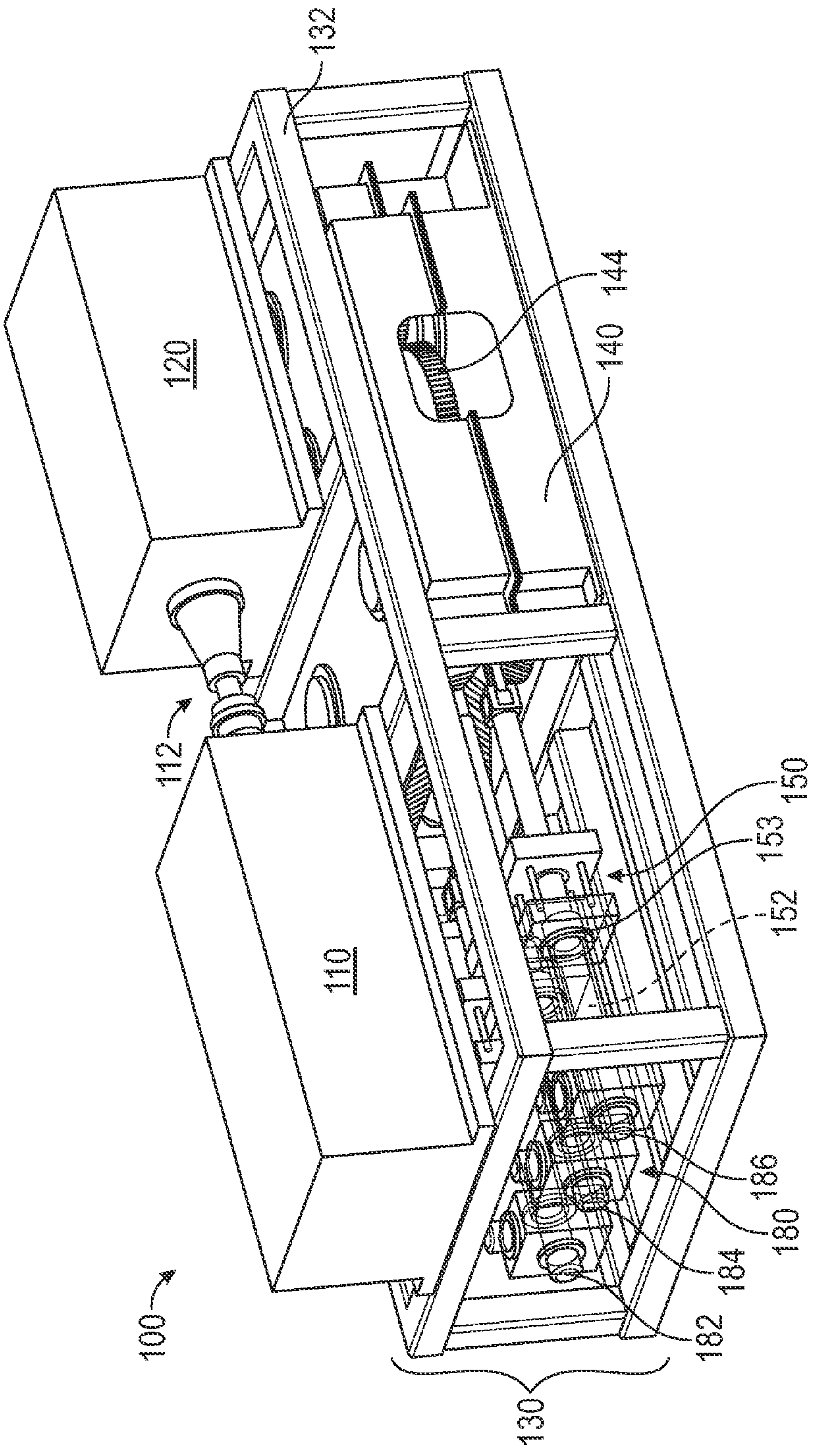
FIG. 1 depicts a view of a reciprocating triplex pump with longer stroke in an example.

Discussed herein is a system including a design for a reciprocating triplex pump. This innovative design includes a longer stroke than conventional pumps. This can allow for a similar flow rate but with a slower pump speed. This can be advantageous by allowing lesser valve cycles per flow, with less resultant wear and tear of fluid end parts.

FIG. 1 and FIGS. 2A-2D depict views of a reciprocating triplex pump 100 with longer stroke in an example. The pump 100 can include a prime mover 110, a gear box 120, and a slider-crank mechanism 130. The prime mover 110 can be attached to the gear box by a coupling 112. The slider-crank mechanism 130 can include a housing 132 at least partially enclosing a rotating member assembly 140 with first gear 142, second gear 144, and third gear 146, and pinion 148, a sliding member assembly 150 with a first sliding member 152 and first cylinder 153, a second sliding member 154 and second cylinder 155, a third sliding member 156 and third cylinder 157, and a connecting rod assembly 160 with a first connecting rod 162, a second connecting rod 164, and a third connecting rod 166. The pump 100 can further include a valve assembly 180, and a suction and discharge manifold 190. The valve assembly 180 can include a first valve 182, a second valve 184, and a third valve 186.

Figure 2A:
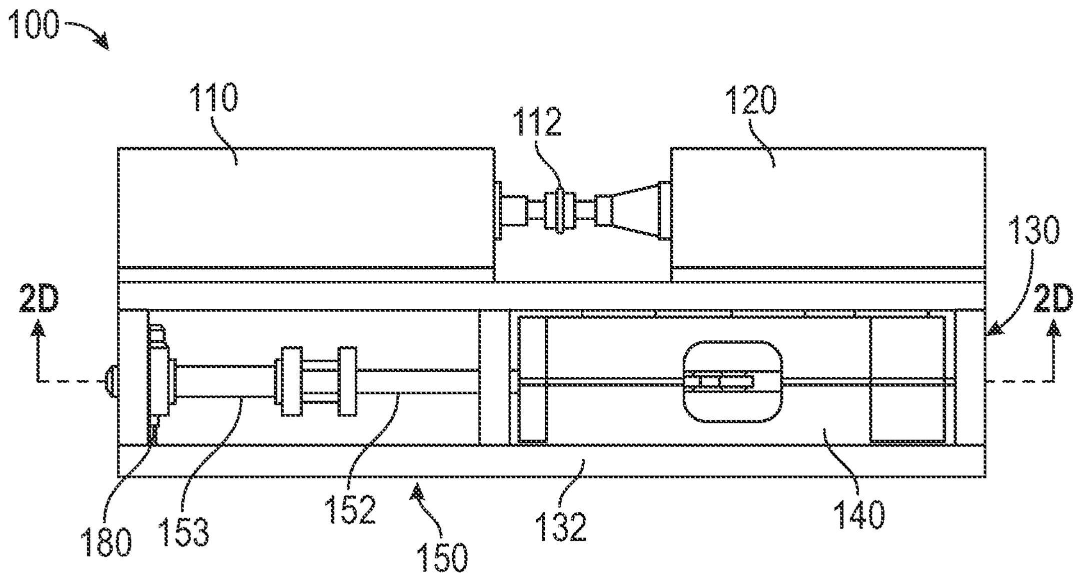
FIGS. 2A-2D depict views of a reciprocating triplex pump with longer stroke in an example.
Figure 2B:
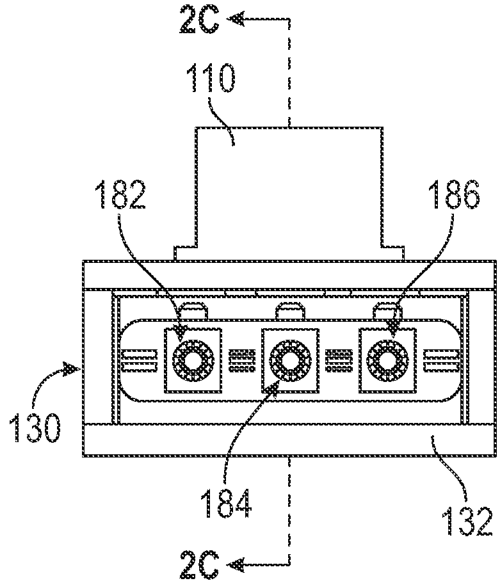
Figure 2C:
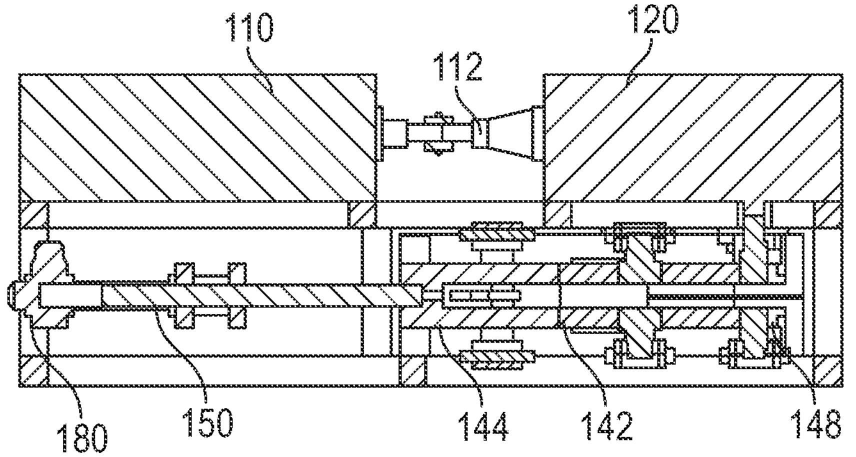
Figure 2D:
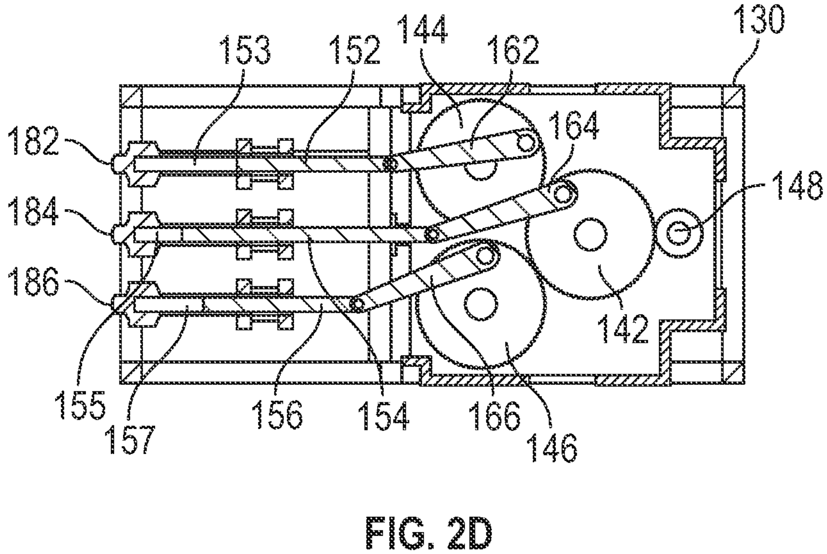

While FIG. 1 depicts a perspective view of the pump 100, FIGS. 2A-2D depict schematic views of the reciprocating triplex pump 100 with longer stroke in an example. FIG. 2A schematic side view of the pump 100 from a first side. FIG. 2B depicts a schematic end view of the pump 100, at the fluid end of the pump 100. FIG. 2C depicts a schematic cross-sectional view of the pump 100 along line A-A in FIG. 2A, while FIG. 2D depicts a schematic cross-sectional view of the pump 100 along line B-B in FIG. 2B. FIGS. 1 to 2D will be discussed together.

The pump 100 is a long stroke parallel pump designed such that the prime mover 110 is driving the gear box 120. The prime mover 110 can include, for example, an electric motor or a reciprocating engine. The prime mover 110 can be attached to the gear box by the coupling 112. The prime mover 110 can provide initial movement. The gear box 120 can reduce rpm produced by the prime mover 110, and increase torque, such as to a predetermined desired value. An output shaft from the gear box 120 can be mechanically coupled to the slider-crank mechanism 130, such as by the pinion 148.

The slider-crank mechanism 130 can include the rotating member assembly 140 and the sliding member assembly 150, joined by the connecting rod assembly 160. The slider-crank mechanism 130 can provide pumping movement for induced flow of fluid through the pump 100. The slider-crank mechanism 130 can include a housing 132 at least partially enclosing the rotating member assembly 140, the sliding member assembly 150, and the connecting rod assembly 160.

The rotating member assembly 140 can include the first gear 142, the second gear 144, and the third gear 146, in addition to the pinion 148. The pinion 148 can be mechanically coupled to the gear box 120, and provide movement to the first gear 142, the second gear 144, and the third gear 146, from the gear box 120. In some cases, the rotating members can be gears, such as spur gears, helical gears, bevel gears, miter gears, worm gears, screw gears, or other types as desired. In some cases, the rotating members can be other components. In some cases, three rotating members can be provided. In some cases, more or less rotating members can be provided as desired.

In the example pump 100, the first gear 142, the second gear 144, and the third gear 146 can be gears having flat surfaces oriented horizontally relative the gear box. In some cases, the first gear 142, the second gear 144, and the third gear 146 can be bull gears that are larger in size than the pinion 148 and aligned parallel to each other. In some cases, the first gear 142, the second gear 144, and the third gear 146 can be of varying sizes. In some cases, the first gear 142, the second gear 144, and the third gear 146 can be substantially the same size. In some cases, the first gear 142, the second gear 144, and the third gear 146 can be stacked relative each other. In some cases, the first gear 142, the second gear 144, and the third gear 146 can be in substantially the same plane of operation. In an example, the first gear 142, the second gear 144, and the third gear 146 can have a gear ratio of 1:1:1.

The first gear 142, the second gear 144, and the third gear 146 can each include teeth for engagement of the other gears. In some cases, teeth engagements can be increased between pinions and bull gears to result in reduced thickness of pinions and gears.

The gear box 120 can induce movement in the rotating member assembly 140 across the first gear 142, the second gear 144, and the third gear 146 via the pinion 148. This movement can, for example, be a singular speed across the first gear 142, the second gear 144, and the third gear 146. The rotating movement of the first gear 142, the second gear 144, and the third gear 146 in the rotating member assembly 140 can be transferred into sliding movement in the sliding member assembly 150 via the slider-crank mechanism of the pump 100.

Shown in FIGS. 1, 2A, and 2C, the gear box 120 and the prime mover 110 can be located laterally with respect to each other. The slider-crank mechanism 130 can be stacked below the prime mover 110 and the gear box 120. For example, the rotating member assembly 140 can be vertically stacked under the gear box 120, saving space in the pump 100 overall.

The sliding member assembly 150 can include the first sliding member 152, the second sliding member 154, and the third sliding member 156. Each of the first sliding member 152, the second sliding member 154, and the third sliding member 156 can correspond to the first cylinder 153, the second cylinder 155, and the third cylinder 157, respectively. Each of the sliding members 152, 154, 156, can be actuatable for lateral movement, such as relative the cylinders, 153, 155, 157. The first sliding member 152, the second sliding member 154, and the third sliding member 156 can be approximately parallel to each other.

The rotating member assembly 140 can be configured to drive the sliding member assembly 150. The sliding member assembly 150 can be mechanically coupled to the rotating member assembly 140 via the connecting rod assembly 160. For example, the first sliding member 152 can be coupled to the first gear 142 via the first connecting rod 162. The second sliding member 154 can be coupled to the second gear 144 via the second connecting rod 164. The third sliding member 156 can be coupled to the third gear 146 via the third connecting rod 166. In some cases, more or less sliding members, rotating members, and connecting rods can be used, as desired.

In the rotating member assembly 140, the pinion 148 can mesh with the first gear 142. The first gear 142 can mesh with the second gear 144 and the third gear 146. The pinion 148 can drive the first gear 142 with a particular gear ratio, reducing speed (e.g., rpm) and increase torque. The speed of the first gear 142 can correspond to the speed of the pump 100. In the example pump 100, the first gear 142, the second gear 144, and the third gear 146 can have a gear ratio of 1:1, therefore maintain the same speed across the three gears. Each of the first gear 142, the second gear 144, and the third gear 146 can be connected to one of the connecting rods 162, 164, 166 by a mechanically coupling such as a pin and bearing. Similarly, the connecting rods 162, 164, 166, can be connected to the respective sliding members 152, 154, 156, by a mechanical coupling, such as a crosshead and bearing. Each of the sliding members 152, 154, 156 can be assembled into respective cylinders 153, 155, and 157, such as with packing and sealing.

The mechanism of the rotating member assembly 140 attached to the sliding member assembly 150 via the connecting rod assembly 160 is referred to as a slider-crank mechanism. The end of the pump 100 with the sliding member assembly 150 can be connected to the valve assembly 180 and the manifold 190. This mechanism can be seen, for example, in FIGS. 2C and 2D.

Figure 3:
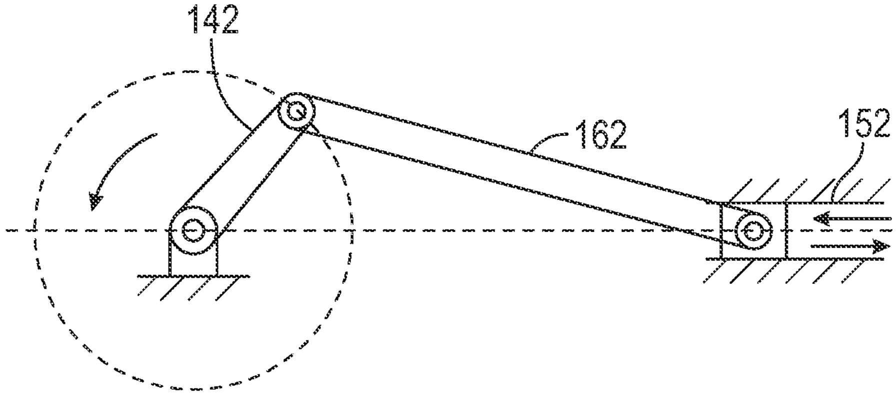
FIG. 3 depicts a schematic view of a slider crank mechanism in an example.
Figure 4:
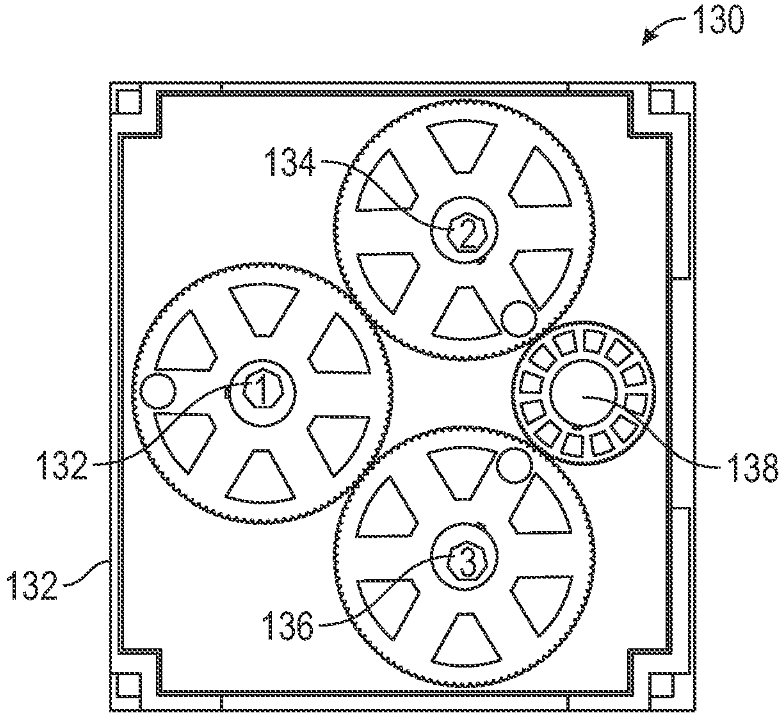
FIG. 4 depicts a view of a bull gear assembly in an example.

FIG. 3 depicts a schematic view of a slider crank mechanism in an example, and FIG. 4 depicts a view of a bull gear assembly in an example. The example slider crank mechanism of FIG. 3 can correspond, for example, to the first gear 142, the first sliding member 152, and the first connecting rod 162. The slider-crank mechanism can allow for conversion of rotational movement of the bull gear assembly of FIG. 4 to linear movement.

The pump 100 can further include the valve assembly 180, such as with the first valve 182, the second valve 184, and the third valve 186. The valves 182, 184, 186, can be coupled to the first sliding member 152, the second cylinder 155, and the third cylinder 157, respectively. The valves 182, 184, 186, can be further coupled to the suction and discharge manifold 190. The valve assembly 180 and the manifold 190 can work in concert to propel fluid through the pump 100.

When in operation, rotational motion of the prime mover 110 can be transferred to the gear box 120, where speed of the movement can be reduced, and pinions therein can rotate with a slower speed than the prime mover 110. The pinion 148 can be rotated by the gear box 120 and drive the first gear 142. The first gear 142 can in turn drive the second gear 144 and the third gear 146. As the first gear 142, the second gear 144, and the third gear 146 can rotate and induce linear motion in the first sliding member 152, the second sliding member 154, and the third sliding member 156. This can initiate and continue the pumping action, suction, and discharge of fluid through the pump 100.

The stroke length of the pump 100 is dependent on the size of the rotating member assembly 140, and the widths of the first gear 142, the second gear 144, and the third gear 146. The first gear 142, the second gear 144, and the third gear 146 can be oriented horizontally within the rotating member assembly 140, such that viewing from the top of the pump 100, such as in FIG. 2D, the diameter of each is on the plane view. The stroke length corresponds to a width of the rotating member assembly, thus, stroke length can be max as allowed by horizontal width of the machine and the diameters of the gears.

Figure 5:
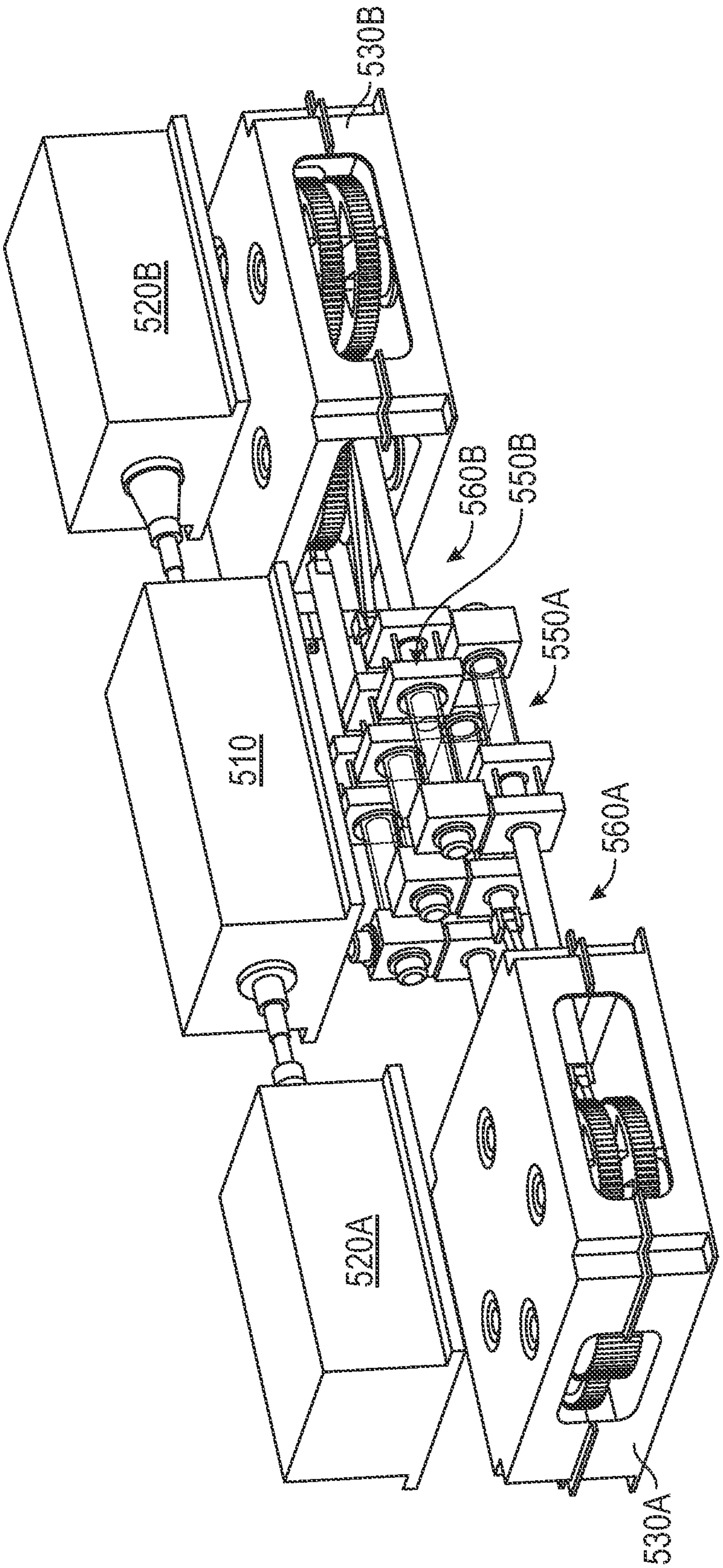
FIG. 5 depicts a view of a triplex pump in an example.

FIG. 5 depicts a view of a pump 500 in an example. The pump 500 can include many of the same components as those in pump 100 discussed above, with the addition of a second slider-crank mechanism opposing the first. For example, the pump 500 can include a prime mover 510, a first coupling 512, a first gear box 520, a second coupling 513, a second gear box 521, a first slider-crank mechanism 530 with a housing 532, a first rotating member assembly 540, a first sliding member assembly 550, and a first connecting rod assembly 560, and a second slider-crank mechanism 531 with a housing 533, a second rotating member assembly 541, a second sliding member assembly 551, and a second connecting rod assembly 561.

In this case, the pump 500 can include a dual shaft extension to attach to both the first gear box 520 and the second gear box 521, and subsequently the first slider-crank mechanism 530 and the second slider-crank mechanism 531. The use of dual slider-crank mechanisms can allow for increased capacity of the pump 500. In some cases, this version can include a larger number of sliding members. In some cases, the sliding members can be equal on either side.

Figure 6:
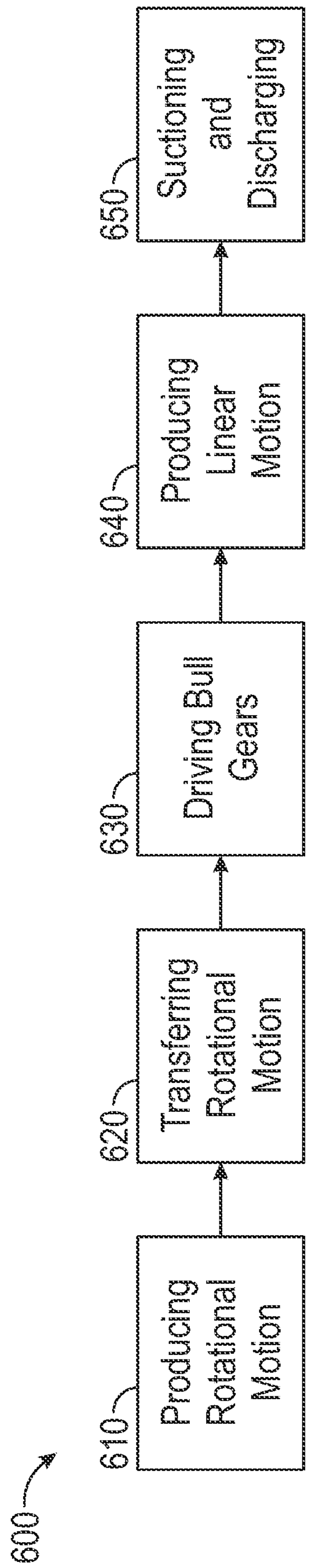
FIG. 6 depicts a method of using a reciprocating triplex pump with longer stroke in an example.

FIG. 6 depicts a method 600 of using a reciprocating triplex pump with longer stroke in an example. In the method 600, rotational movement can be made at a prime mover (block 610). This rotational movement can be transferred to a gear box, where it is reduced in speed (block 620). The rotational movement can drive bull gears via one or more pinions (block 630). The rotational movement can be transitioned to linear movement via sliding members coupled to the bull gears (block 640). This movement can be used to suction and discharge fluid (block 650).

In some cases, this method can be used to alter linear movement stroke length. In some cases, driving a plurality of bull gears can include driving a first bull gear which induced rotational movement in a second bull gear and a third bull gear. In some cases, pumping fluid can be done at a high pressure and a constant flow.

Figure 7:
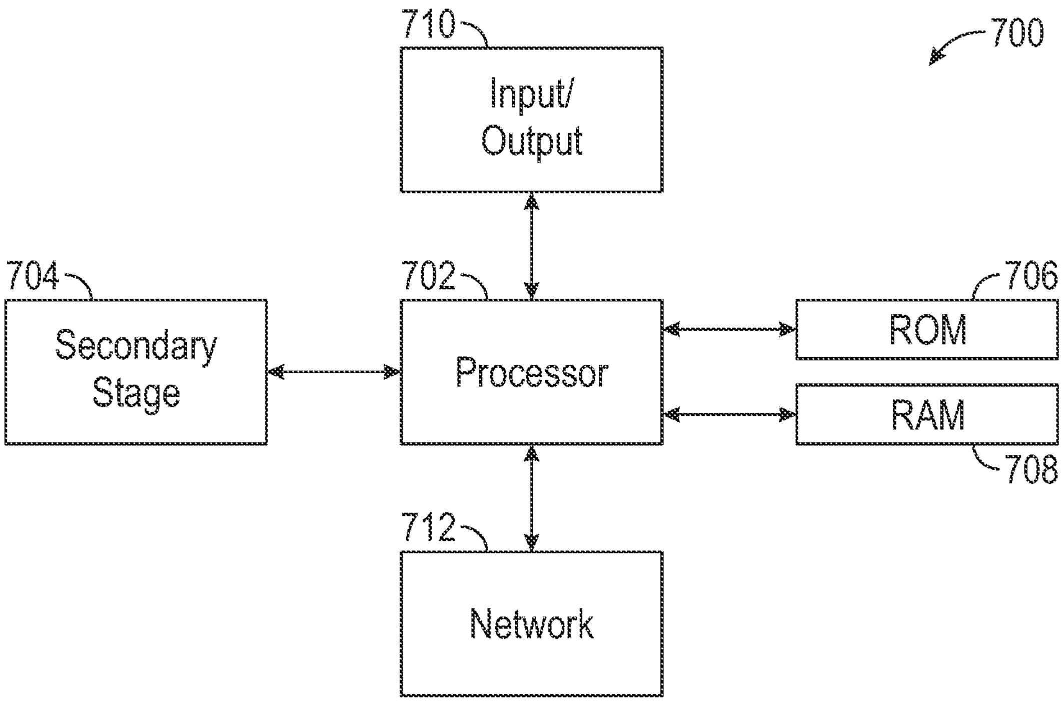
FIG. 7 depicts a view of a controller circuitry in an example.

FIG. 7 illustrates a block diagram of an example computing system machine 700 upon which any one or more of the techniques (e.g., methodologies) discussed herein may perform. Machine 700 (e.g., computer system) may include a hardware processor 702 (e.g., a central processing unit (CPU), a graphics processing unit (GPU), a hardware processor core, or any combination thereof), a main memory 704 and a static memory 706, connected via an interconnect 708 (e.g., link or bus), as some or all of these components may constitute hardware for systems 100 or 200 or hardware to operate the services and subsystems and related implementations discussed above.

Specific examples of main memory 704 include Random Access Memory (RAM), and semiconductor memory devices, which may include, in some embodiments, storage locations in semiconductors such as registers. Specific examples of static memory 706 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 700 may further include a display device 710, an input device 712 (e.g., a keyboard), and a user interface (UI) navigation device 714 (e.g., a mouse). In an example, the display device 710, input device 712 and UI navigation device 714 may be a touch screen display. The machine 700 may additionally include a mass storage device 716 (e.g., drive unit), a signal generation device 718 (e.g., a speaker), a network interface device 720, and one or more sensors 730, such as a global positioning system (GPS) sensor, compass, accelerometer, or some other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the hardware processor 702 and/or instructions 724 may comprise processing circuitry and/or transceiver circuitry.

The mass storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the mass storage device 716 constitutes, in at least some embodiments, machine readable media.

The term "machine readable medium" includes, in some embodiments, any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Specific examples of machine readable media include, one or more of non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks. While the machine readable medium 722 is illustrated as a single medium, the term "machine readable medium" includes, in at least some embodiments, a single medium or multiple media (e.g., a centralized or distributed database, and/or associated caches and servers) configured to store the one or more instructions 724. In some examples, machine readable media includes non-transitory machine readable media. In some examples, machine readable media includes machine readable media that is not a transitory propagating signal.

The instructions 724 are further transmitted or received, in at least some embodiments, over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, a Long Term Evolution (LTE) 4G or 5G family of standards, a Universal Mobile Telecommunications System (UMTS) family of standards, peer-to-peer (P2P) networks, satellite communication networks, among others.

An apparatus of the machine 700 includes, in at least some embodiments, one or more of a hardware processor 702 (e.g., a central processing unit (CPU), a graphics processing unit (GPU), a hardware processor core, or any combination thereof), a main memory 704 and a static memory 706, sensors 730, network interface device 720, antennas 732, a display device 710, an input device 712, a UI navigation device 714, a mass storage device 716, instructions 724, a signal generation device 718, and an output controller 728. The apparatus is configured, in at least some embodiments, to perform one or more of the methods and/or operations disclosed herein. The apparatus is, in some examples, a component of the machine 700 to perform one or more of the methods and/or operations disclosed herein, and/or to perform a portion of one or more of the methods and/or operations disclosed herein.

In an example embodiment, the network interface device 720 includes one or more physical jacks (e.g., Ethernet, coaxial, or phone jacks) or one or more antennas to connect to the communications network 726. In an example embodiment, the network interface device 720 includes one or more antennas 732 to wirelessly communicate using at least one of single-input multiple-output (SIMO), multiple-input multiple-output (MIMO), or multiple-input single-output (MISO) techniques. In some examples, the network interface device 720 wirelessly communicates using Multiple User MIMO techniques. The term "transmission medium" shall be taken to include any intangible medium that is capable of storing, encoding or carrying instructions for execution by the machine 700, and includes digital or analog communications signals or other intangible medium to facilitate communication of such software.

At least some example embodiments, as described herein, include, or operate on, logic or a number of components, modules, or mechanisms. Such components are tangible entities (e.g., hardware) capable of performing specified operations and are configured or arranged in a certain manner. In an example, circuits are arranged (e.g., internally or with respect to external entities such as other circuits) in a specified manner as a module. In an example, the whole or part of one or more computer systems (e.g., a standalone, client or server computer system) or one or more hardware processors are configured by firmware or software (e.g., instructions, an application portion, or an application) as a component that operates to perform specified operations. In an example, the software resides on a machine readable medium. In an example, the software, when executed by the underlying hardware of the component, causes the hardware to perform the specified operations.

Accordingly, such components are understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the modules need not be instantiated at any one moment in time. For example, where the components comprise a general-purpose hardware processor configured using software, in some embodiments, the general-purpose hardware processor is configured as respective different components at different times. Software accordingly configures a hardware processor, for example, to constitute a particular component at one instance of time and to constitute a different component at a different instance of time.

Some embodiments are implemented fully or partially in software and/or firmware. This software and/or firmware takes the form of instructions contained in or on a non-transitory computer-readable storage medium, in at least some embodiments. Those instructions are then read and executed by one or more hardware processors to enable performance of the operations described herein, in at least some embodiments. The instructions are in any suitable form, such as but not limited to source code, compiled code, interpreted code, executable code, static code, dynamic code, and the like. Such a computer-readable medium includes any tangible non-transitory medium for storing information in a form readable by one or more computers, such as but not limited to read only memory (ROM); random access memory (RAM); magnetic disk storage media; optical storage media; flash memory, etc.

Various embodiments may be implemented fully or partially in software and/or firmware. This software and/or firmware may take the form of instructions contained in or on a non-transitory computer-readable storage medium. Those instructions are then read and executed by one or more processors to enable performance of the operations described herein. The instructions are in any suitable form, such as but not limited to source code, compiled code, interpreted code, executable code, static code, dynamic code, and the like. Such a computer-readable medium includes, in at least some embodiments, any tangible non-transitory medium for storing information in a form readable by one or more computers, such as but not limited to read only memory (ROM); random access memory (RAM); magnetic disk storage media; optical storage media; flash memory, etc.

Referring now to FIGS. 8-12B, an additional example of a pump 800 is shown. The pump 800 may be similar to the pump 100 described with respect to FIGS. 1-4. For example, the pump 800 may include a prime mover (not shown) operably coupled to a gear box 820, which may be operably coupled to a slider-crank mechanism 830 including a rotating member assembly 840 and a sliding member assembly 850 operably coupled to one another via one or more connecting rods 862, 864, 866 (see FIGS. 10-12B). The pump 800 may also include a valve assembly 880. The connecting rods 862, 864, and 866, the sliding member assembly 850 and the valve assembly 880 may be the same or similar to the respective elements of the example described with respect to FIGS. 1-4. The rotating member assembly 840 may also be the same or similar. One or more differences between the pump 100 and the pump 800 may be present where, for example, the pump 800 has an integrated gear box 820. Still further, the operable coupling of the gear system or gear box 820 to the rotating member assembly 840 may differ from that of the pump 100. Finally, the pump 800 may be an in line pump system where the drive shaft delivers rotational power to the gear system, which reorients the rotational power to drive a plurality of rotating members and then a connecting rod system and a sliding member system extend further away from the drive shaft an "in line" with or parallel to the drive shaft rather than switching direction back toward the drive shaft like the pump 100. Still other differences may be present.

Figure 8:
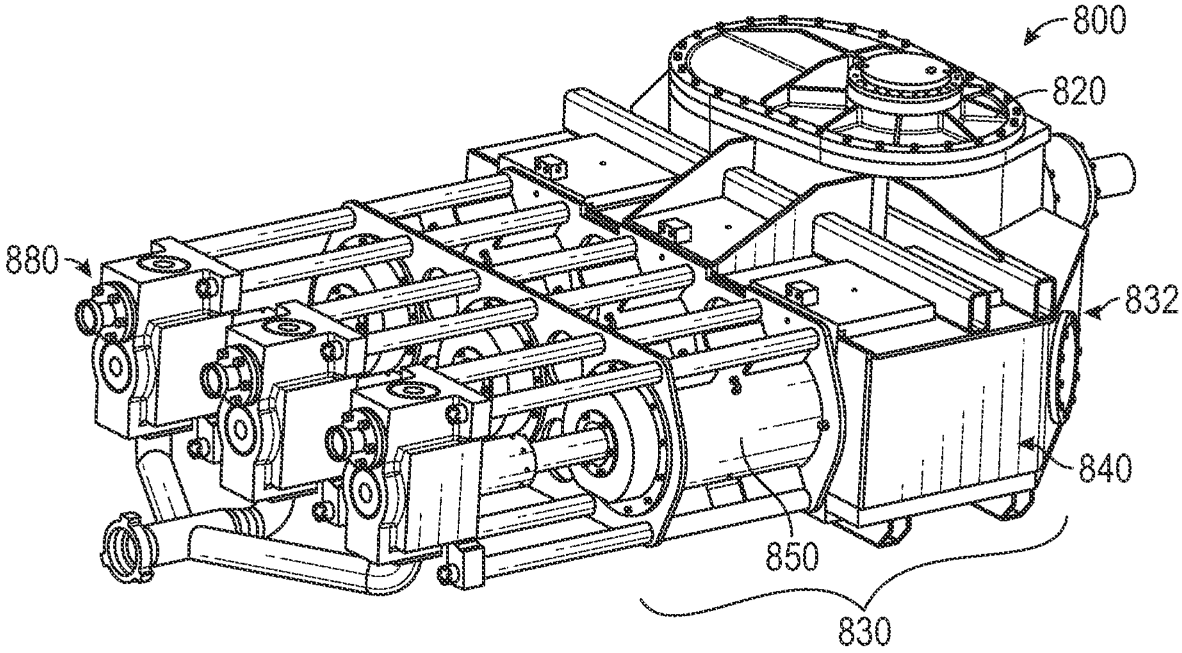
FIG. 8 is a perspective view of a pump similar to the pump shown and described in FIGS. 1-4 and including an integrated gearbox, according to one or more examples.
Figure 9:
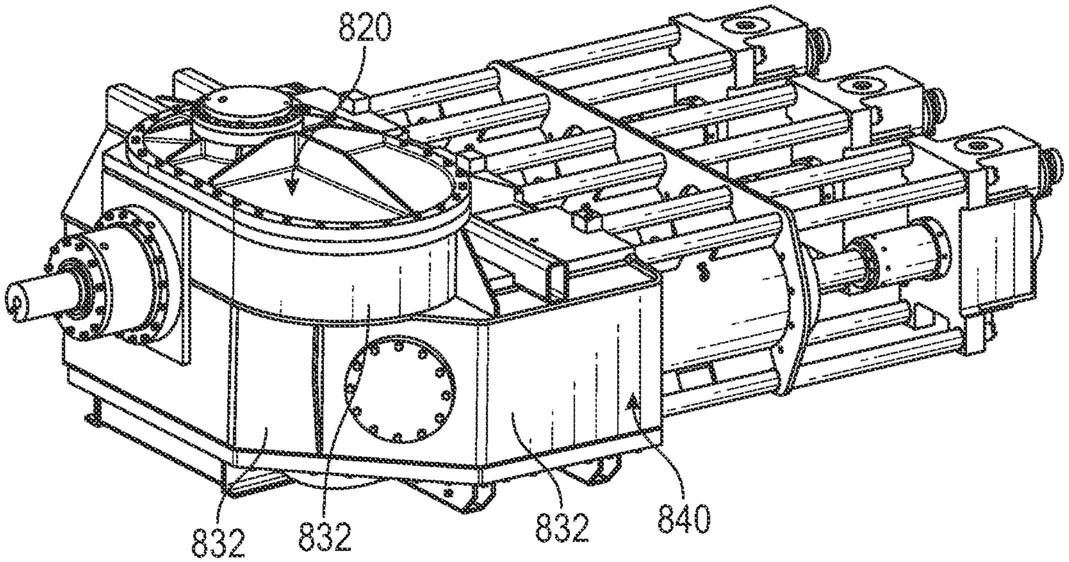
FIG. 9 is an additional perspective view thereof.

As shown in FIGS. 8 and 9, and like the pump 100, the pump 800 may include a housing 832 enclosing the rotating member assembly 840. However, in the present example, the gear box 820, or gear system, may be integrated into the rotating member assembly 840 and a portion of the housing 832 may encompass the gear box 820 or gear system.

Figure 10:
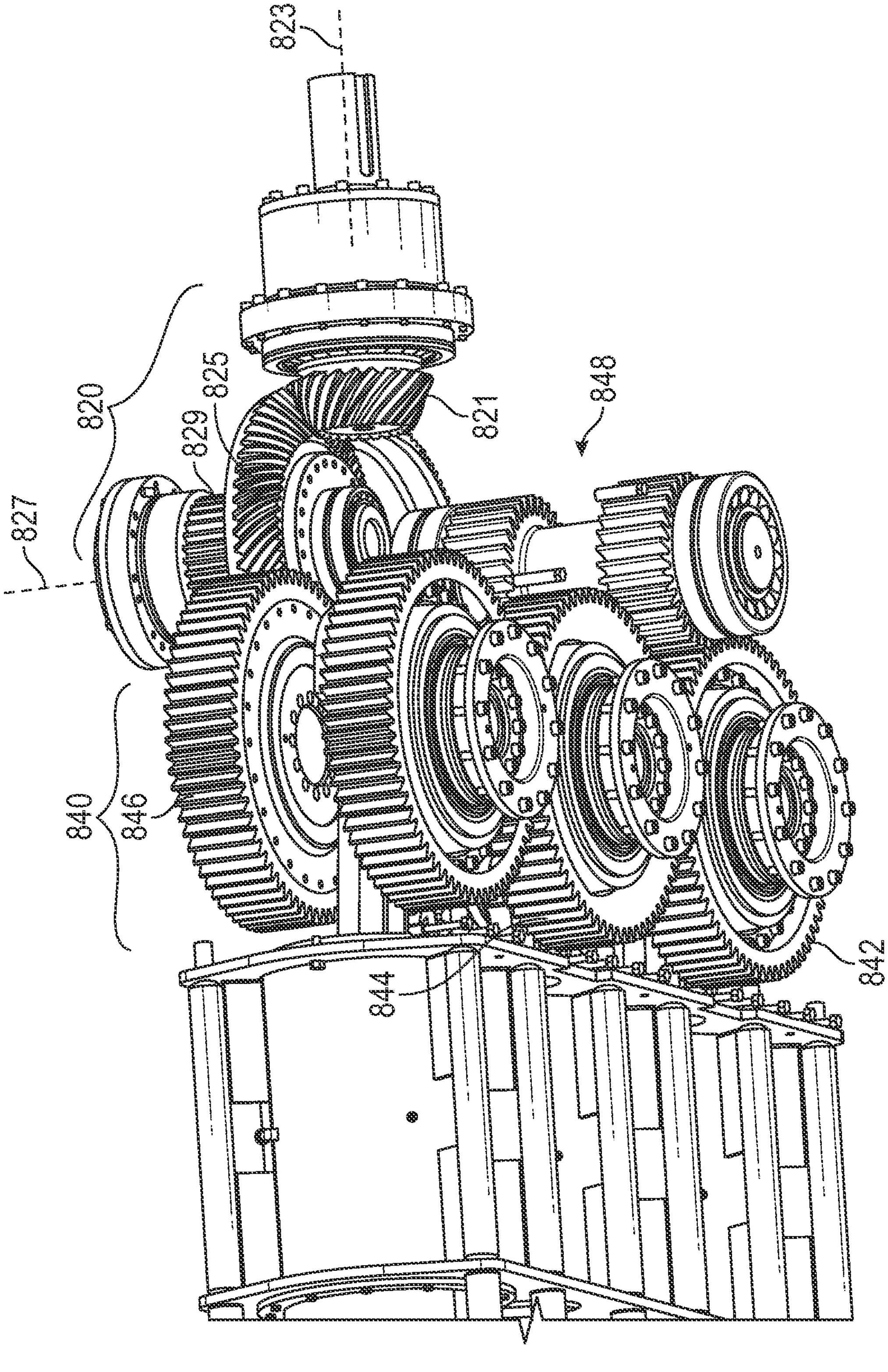
FIG. 10 is a side and bottom perspective view of the interface between the drive shaft and the gearbox, according to one or more examples.
Figure 11:
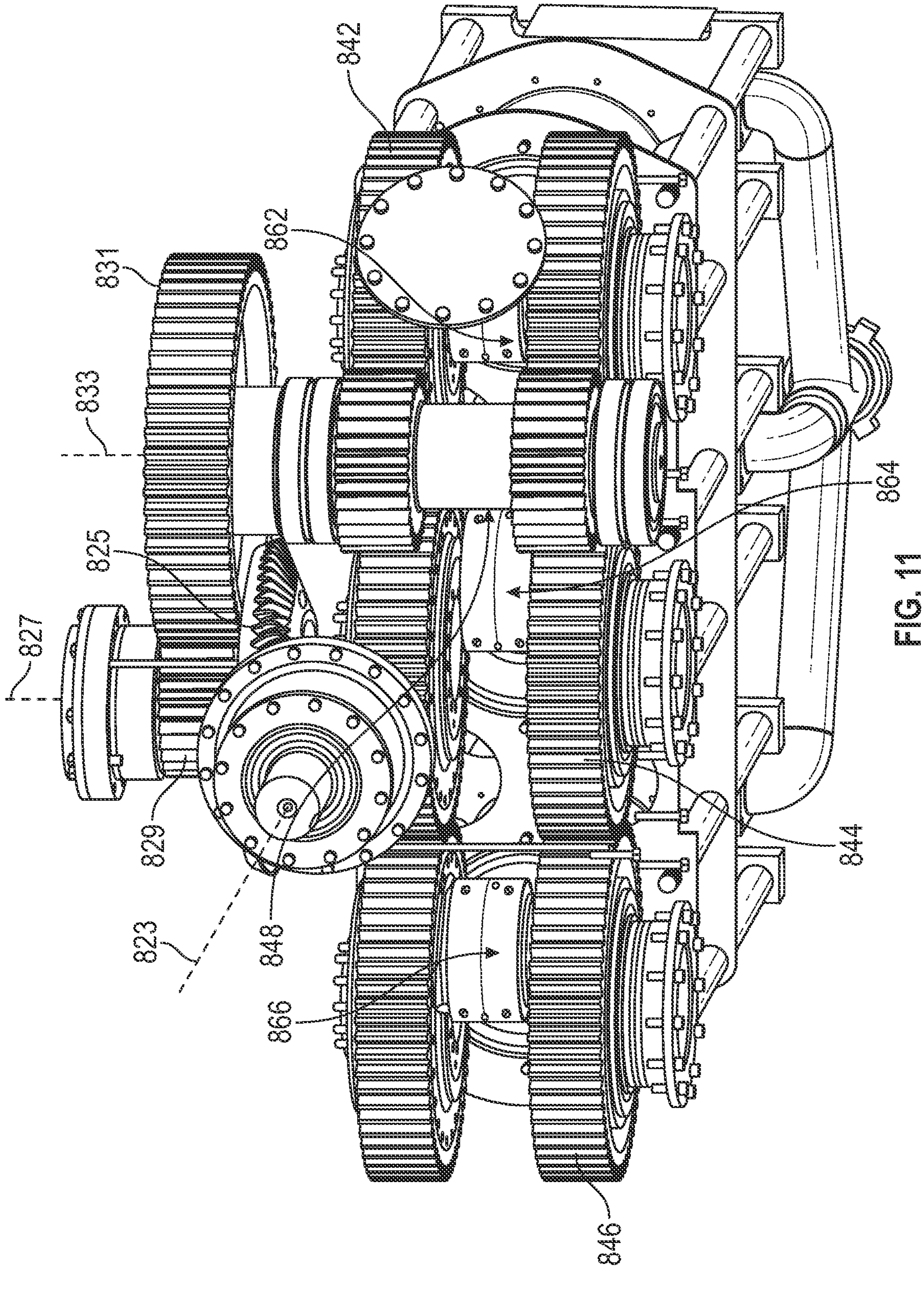
FIG. 11 is a rear perspective view of the gearbox, according to one or more examples.

As with the pump 100, the gear box or gear system 820 may be configured to receive rotational power from the prime mover via a coupling, drive shaft, or other rotating member 812. The gear system 820 may be further configured to reorient the rotational power and/or provide some speed and/or torque adjustment. In the present example, and as shown in FIGS. 10-11, the gear system 820 may include a bevel gear system where a driving bevel gear 821 is provided on the end of the drive shaft and is arranged to rotate about a horizontal axis 823 of the drive shaft. An additional driven bevel gear 825 may be provided to engage with the driving bevel gear 821 and the driven bevel gear 825 may be arranged to rotate about a vertical axis 827. In one or more examples, the diameter of the driven bevel gear 825 may be larger than the diameter of the driving bevel gear 821 and, as such, may slow the rate of rotation and increase the torque transfer capability. As shown in FIG. 11, a generally cylindrical gear 829 may be provided above the driven bevel gear 825 on the same shaft as the driven bevel gear 825 so as to rotate with the driven bevel gear 825. The cylindrical gear 829 may have a smaller diameter than the driven bevel gear 825, but may rotate at the same rate as the driven bevel gear 825 by way of being arranged on the same shaft as the driven bevel gear 825. As may be appreciated by way of the driven bevel gear 825 and the cylindrical gear 829 being arranged on the same shaft, both gears may rotate about a common axis 827 that is orthogonal to the longitudinal axis 823 of the drive shaft.

With continued reference to FIG. 11, the gear system 820 may also include a pinion drive gear 831. The pinion drive gear 831 may be offset laterally from the cylindrical gear 829 and be arranged in the same plane as the cylindrical gear 829 so as to operably engage the cylindrical gear 829 with gear teeth. That is, as the cylindrical gear 829 rotates, the pinion drive gear 831 may rotate. The pinion drive gear 831 may have a diameter larger than the cylindrical gear 829 and, as such, may further slow the rate of rotation and increase the torque transfer capability. As shown, a pinion gear 848 may be provided below the pinion drive gear 831 on the same shaft as the pinion drive gear 831 so as to rotate with the pinion drive gear 831. The pinion gear 840 may have a smaller diameter than the pinion drive gear 831, but may rotate at the same rate as the pinion drive gear 831 by way of being arranged on the same shaft as the pinion drive gear 831. The pinion drive gear 831 and the pinion gear 848 may rotate about a common axis 833 that is offset laterally from the rotational axis 827 of the driven bevel gear 831 and the cylindrical gear 829 and the axis 833 remains orthogonal to the longitudinal axis 823 of the drive shaft.

Like the pump 100, the rotating member assembly 840 of the present pump 800 may include one or more rotating members such as members 842, 844, and 846, which may be bull gears, split bull gears, or other gear types. The rotating members may be offset laterally from the pinion gear 848, but coplanar with the pinion gear 848. At least one of the rotating members may be engaged with the pinion gear 848 to be driven by the pinion gear 848. That is, like the pump 100, the pinion gear 848 may drive one or more of the rotating members of the rotating member assembly 840. In one or more examples, the pinion gear 848 may drive one of the rotating members and that rotating member may drive one or more of the other rotating members. In the present example, the rotating member 842 may be driven by the pinion gear 848 and may have a diameter larger than the pinion gear 848 and, as such, may further slow the rate of rotation and increase the torque transfer capability.

In one or more examples, and in contrast to the rotating member arrangement of the pump 100, the rotating members 842, 844, and 846 of the pump 800 may be arranged in line with one another and the driving of the rotating members may be in series. With respect to being arranged in line, the rotational axes of the several rotating members may fall on a single line that is orthogonal to all of the rotational axes. With respect to driving being in series, the pinion gear 848 may drive rotating member 842, which may drive rotating member 844, which may drive rotating member 846. In other examples, the pinion 848 may drive one, two, three, or other numbers of the rotating members directly, which may then drive other rotating members.

As mentioned, the rotating members 842, 844, and 846 of the pump 800 may also be split gears. That is, as shown in FIGS. 10 and 11, the pinion gear 848 may be a split gear having an upper and a lower gear offset from each other along a rotation axis and connected with a central shaft. The rotating members 842, 844, and 846 may have corresponding upper and lower gears offset from each other along a rotation axis, but connected with a connecting rod pin/bearing arranged closer to the perimeter of the pair of gears. That is, the upper and lower gears of the rotating members 842, 844, 846 may be separately pivotally supported by the housing and spaced from one another to allow an end of the connecting member to be arranged between the gears and to follow the cross pin passing through a full circular path as the upper and lower gears rotate. For example, a shaft extending between the upper and lower gears along the rotational axis may be omitted to allow for motion of the connecting rod between the upper and lower gears.

The series of rotating members may, thus, provide individual, adjacently arranged crank shafts (e.g., u-shaped cranks where the cranks or webs are formed by a radially extending portion of the upper and lower gears connected by a crankpin journal formed by the pin extending between the gears). The adjacently arranged crank shafts (e.g., sets of upper and lower gears) may have parallel and offset rotational axes and may rotate dependently on each other based on the engagement of the gears of adjacent rotating members. As discussed, this may be by way of arranging the rotating members in series (e.g., one after the other). Alternatively, a parallel driving arrangement or some combination of series and parallel driving arrangements may be provided (e.g., parallel being where one gear drives multiple other gears).

It is to be appreciated, and as mentioned, that the transition from smaller gears to larger gears may provide for a reduction in speed and an increase in the torque transfer capability. In the present example, three occurrences of this occur (e.g., between the drive bevel gear 821 and the driven bevel gear 825, from the cylindrical gear 829 to the pinion drive gear 831, and from the pinion gear 848 to the rotating member 842). While three occurrences are provided in the present example, more or fewer of these types of transitions may be provided depending on the design requirements of the system.

Figure 12A:
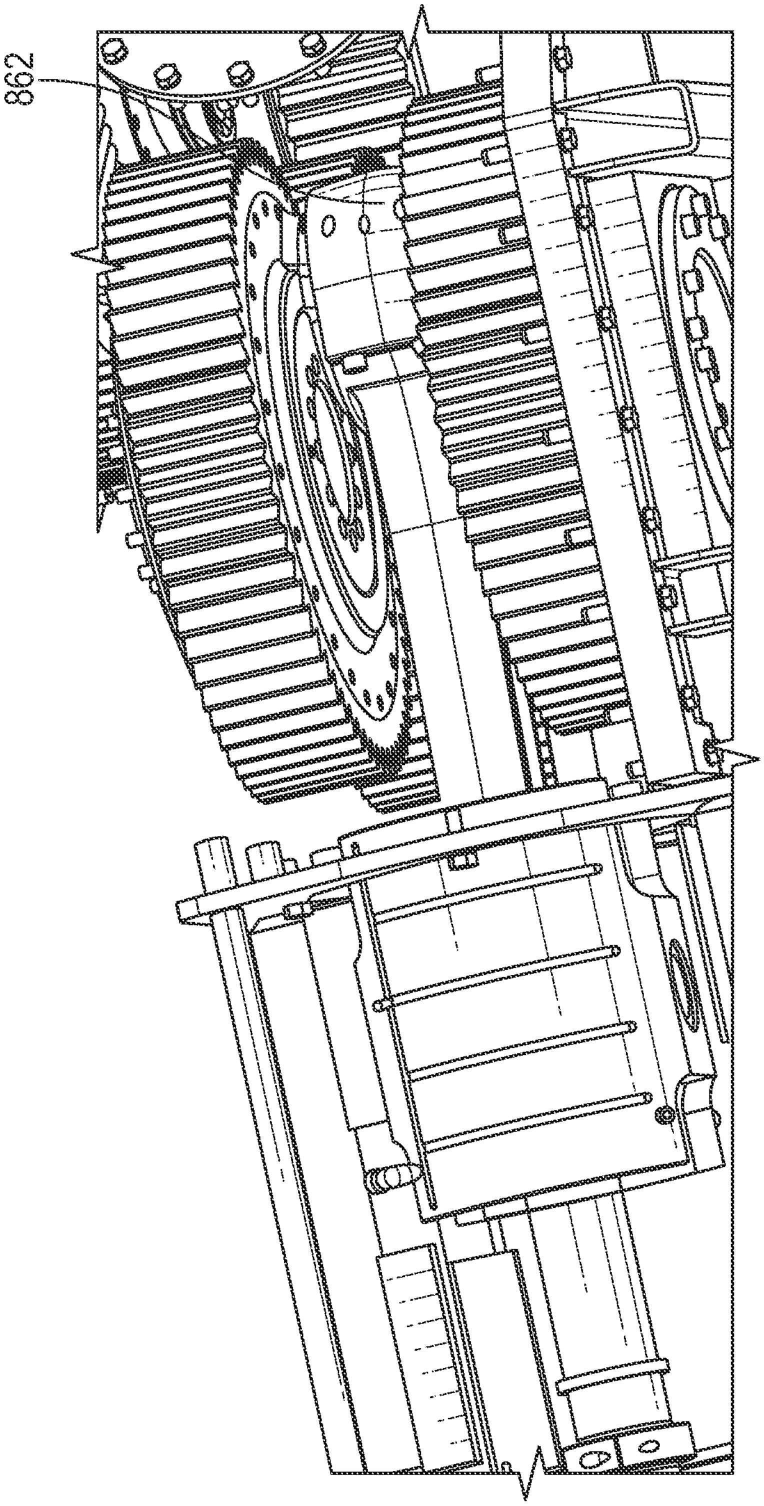
FIG. 12A is a close-up perspective view of a slider crank mechanism of the pump of FIGS. 8-11, according to one or more examples.
Figure 12B:
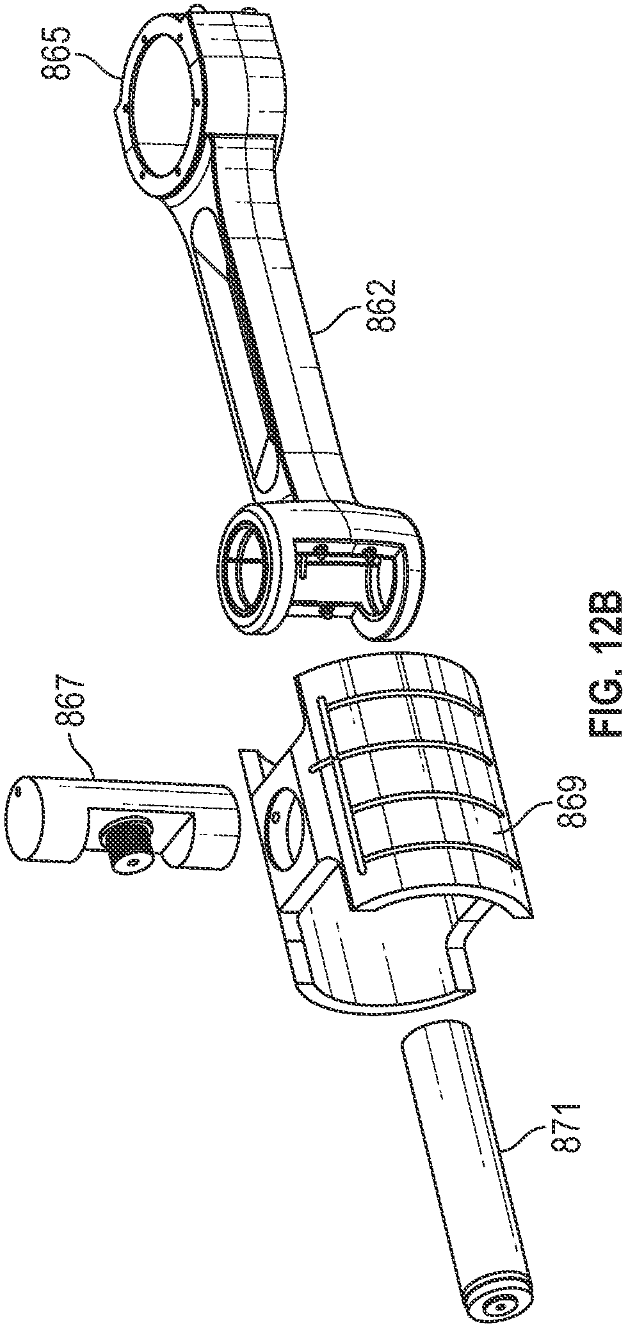
FIG. 12B is an exploded perspective view of a connecting rod and a slider member assembly including a cross head, wrist pin and a pony rod, according to one or more examples.

FIG. 12A shows a close-up view of the connecting rod 862 arranged between upper and lower gears of a rotating member 842. As shown in FIGS. 12A and 12B, the connecting rod 862 may include a cylindrical clamp end 865 that may be clamped onto a cross pin extending between the upper and lower gears of the rotating member 842. A bearing or other pivot providing device may be arranged within the clamp end 865 and around the cross pin to allow the connecting rod 862 to follow the pin around the circle established by the cross pin rotating about the pivot axis of the upper and lower gears. The connecting rod 862 may extend away from the rotating member 842 and be pivotally connected to a wrist pin 867 arranged in a crosshead 869. The wrist pin 867 may be coupled to a pony rod 871, which may be connected to a piston rod that functions to draw in fluid and discharge fluid from a pump cylinder. The connecting rod 862, crosshead 869, wrist pin 867 and pony rod 871 assembly may be the same or similar to that show and described in US patent application entitled Direct Load Wrist Pin and file the same day as the present application, the content of which is hereby incorporated by reference herein in its entirety.

While particular aspects of the pump 800 have been shown and described, other aspects of the pump 100 may be the same or similar to corresponding aspects of the pump 100. Moreover, particular aspects of the pump 100 and 800 and pump 500, for that matter, may be interchanged and substituted as will be appreciated by those of skill in the art.

Various Notes & Examples

Example 1 is a fluid pump system comprising: a drive shaft extending along a longitudinal axis and supplying rotation about the longitudinal axis; a gear system operably coupled to the shaft for changing the orientation of the rotation supplied by the drive shaft; and a slider-crank mechanism comprising: a rotating member assembly mechanically coupled to the gear system, the rotating member assembly comprising a plurality of rotating members having respective rotational axes offset laterally from one another and generally orthogonal to the longitudinal axis, a sliding member assembly mechanically coupled to the rotating member assembly and extending away from the drive shaft, wherein the rotating member assembly is configured to drive reciprocating motion of the sliding member to alternately draw fluid in and discharge fluid; and a connecting rod assembly mechanically coupling the rotating member assembly to the sliding member assembly. In example 1, the gear system optionally comprises a drive bevel gear and a driven bevel gear. In example 1, optionally, the gear system and the rotating member assembly together comprise three levels of gear reduction, where each reduction decreases the speed of rotation and increases the torque transfer capacity. Also, optionally, a first gear reduction is provided between a drive bevel gear arranged on the drive shaft and a driven bevel gear within the gear system. Optionally, a second gear reduction is provided between a cylindrical gear that shares a shaft with the driven beven gear and a pinion drive gear. As another option, a third gear reduction is provided between a pinion gear and at least on of the plurality of rotating members. The plurality of rotating members also optionally comprise three rotating members and the rotational axes of the three rotating members are parallel to and offset from one another and are arranged along a line extending orthogonally to the rotational axes. The rotating member assembly also optionally comprises a rotating member comprising a split gear.

In Example 2, the subject matter of Example 1 optionally includes wherein the plurality of rotating members comprises a first rotating member, a second rotating member, and a third rotating member.

In Example 3, the subject matter of Example 2 optionally includes wherein each of the first rotating member, the second rotating member, and the third rotating member having a flat surface oriented horizontally relative the gear box.

In Example 4, the subject matter of any one or more of Examples 2-3 optionally include wherein the first rotating member, the second rotating member, and the third rotating member each comprise bull gears.

In Example 5, the subject matter of any one or more of Examples 2-4 optionally include In Example 6, the subject matter of any one or more of Examples 2-5 optionally include wherein the rotating member assembly is actuatable at a singular speed across the first rotating member, the second rotating member, and the third rotating member.

In Example 7, the subject matter of any one or more of Examples 1-6 optionally include wherein a stroke length corresponds to a width of the rotating member assembly.

In Example 8, the subject matter of any one or more of Examples 2-7 optionally include wherein the sliding member assembly comprises a first sliding member, a second sliding member, and a third sliding member, each of the first sliding member, the second sliding member, and the third sliding member parallel each other.

In Example 9, the subject matter of Example 8 optionally includes wherein the connecting rod assembly comprises a first connecting rod coupling the first rotating member to the first sliding member, a second connecting rod coupling the second rotating member to the second sliding member, and a third connecting rod coupling the third rotating member to the third sliding member.

In Example 10, the subject matter of any one or more of Examples 1-9 optionally include wherein the prime mover comprising an electric motor or a reciprocating engine.

In Example 11, the subject matter of any one or more of Examples 1-10 optionally include a cylinder assembly mechanically coupled and sealed to the sliding member assembly, wherein the rotating member assembly is configured to drive the cylinder assembly.

In Example 12, the subject matter of any one or more of Examples 1-11 optionally include a valve assembly mechanically coupled to the cylinder assembly, wherein the rotating member assembly is configured to drive the valve assembly.

In Example 13, the subject matter of Example 12 optionally includes a suction and discharge manifold coupled to the valve assembly.

In Example 14, the subject matter of any one or more of Examples 2-13 optionally include wherein a stroke length corresponds to sizes of the first rotating member, the second rotating member, and the third rotating member.

In Example 15, the subject matter of any one or more of Examples 2-14 optionally include wherein the first rotating member, the second rotating member, and the third rotating member each comprise teeth for engagement of the other gears.

In Example 16, the subject matter of any one or more of Examples 1-15 optionally include a dual shaft extension, a second gear box, and a second slider-crank mechanism, the second gear box coupled to the prime mover.

Example 17 is a method of pumping fluid comprising: receiving rotational movement about a longitudinal axis from a primer mover; using a gear system, reorienting the rotational movement to be about an axis orthogonal to the longitudinal axis, driving a plurality of rotating members, the rotating members rotating about an axis orthogonal to the longitudinal axis; producing linear movement in a plurality of sliding members each coupled to one of the plurality of gears and extending away from the prime mover; and suctioning and discharging the fluid with the linear movement.

Example 18 is a method of pumping fluid comprising: producing rotational movement at a primer mover; transferring the rotational movement to a gear box and reducing speed of the rotational movement to a predetermined level; driving a plurality of bull gears with the reduced rotational movement via a plurality of corresponding pinions; producing linear movement in a plurality of sliding members each coupled to one of the plurality of bull gears; and suctioning and discharging the fluid with the linear movement.

In Example 19, the subject matter of Example 18 optionally includes wherein driving a plurality of bull gears comprises driving a first bull gear which induced rotational movement in a second bull gear and a third bull gear.

In Example 20, the subject matter of any one or more of Examples 18-19 optionally include wherein pumping fluid is done at a high pressure and a constant flow.

In Example 21, the subject matter of any one or more of Examples 18-20 optionally include wherein the bull gears are driven at a reduced rotational movement compared to the gear box.

Each of these non-limiting examples can stand on its own or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A fluid pump system comprising:

a drive shaft extending along a longitudinal axis and supplying rotation about the longitudinal axis;

a gear system operably coupled to the drive shaft for changing the orientation of the rotation supplied by the drive shaft; and a slider-crank mechanism, comprising:

a rotating member assembly mechanically coupled to and driven by the gear system, the rotating member assembly comprising at least three split gears having respective rotational axes offset laterally from one another and generally orthogonal to the longitudinal axis, wherein the rotating member assembly is driven by a pinion gear of the gear system, wherein the pinion gear is configured to mesh with both the upper and lower gears of at least one of the at least three split gears, a sliding member assembly mechanically coupled to the rotating member assembly and extending away from the drive shaft, the sliding member assembly including at least three sliding members, wherein respective ones of the at least three split gears are configured to drive corresponding respective ones of the at least three sliding members, wherein the rotating member assembly is configured to drive reciprocating motion of the sliding member assembly to alternately draw fluid in and discharge the fluid; and a connecting rod assembly mechanically coupling the rotating member assembly to the sliding member assembly, the connecting rod assembly including at least three connecting rods, the at least three connecting rods mechanically coupling respective split gears of the rotating member assembly to respective sliding members of the sliding member assembly.

2. The pump system of claim 1, wherein the gear system comprises a drive bevel gear and a driven bevel gear.

3. The pump system of claim 1, wherein the gear system and the rotating member assembly together comprise three levels of gear reduction, where each reduction decreases the speed of rotation and increases the torque transfer capacity.

4. The pump system of claim 3, wherein a first gear reduction is provided between a drive bevel gear arranged on the drive shaft and a driven bevel gear within the gear system.

5. The pump system of claim 4, wherein a second gear reduction is provided between a cylindrical gear that shares a shaft with the driven bevel gear and a pinion drive gear.

6. The pump system of claim 5, wherein a third gear reduction is provided between the pinion gear and the at least one of the at least three split gears.

7. The pump system of claim 1, wherein the rotational axes of the at least three split gears are parallel to and offset from one another and are arranged along a line extending orthogonally to the rotational axes.

8. The system of claim 1, wherein a stroke length of the corresponding respective ones of the at least three sliding members corresponds to a width of the respective ones of the at least three split gears.

9. The pump system of claim 1, wherein respective connecting rods of the connecting rod assembly are pivotally secured between respective upper and lower gears of the respective split gears.

10. The pump system of claim 9, wherein the respective connecting rods of the connecting rod assembly are pivotally secured between the respective upper and lower gears of the respective split gears by a pin extending between the respective upper and lower gears of the respective split gears.

11. The system of claim 1, wherein the at least three split gears comprise a first split gear, a second split gear, and a third split gear.

12. The system of claim 11, wherein each of the first split gear, the second split gear, and the third split gear have a flat surface oriented horizontally relative to the gear system.

13. The system of claim 12, wherein the first split gear, the second split gear, and the third split gear each comprise bull gears.

14. The system of claim 12, wherein the first split gear, the second split gear, and the third split gear have a gear ratio of 1:1:1.

15. The system of claim 12, wherein the rotating member assembly is actuatable at a singular speed across the first split gear, the second split gear, and the third split gear.

16. The system of claim 12, wherein the sliding member assembly comprises a first sliding member, a second sliding member, and a third sliding member, wherein each of the first sliding member, the second sliding member, and the third sliding member are parallel to each other.

17. The system of claim 16, wherein the connecting rod assembly comprises a first connecting rod coupling the first split gear to the first sliding member, a second connecting rod coupling the second split gear to the second sliding member, and a third connecting rod coupling the third split gear to the third sliding member.

18. A method of pumping fluid comprising:

receiving rotational movement about a longitudinal axis from a prime mover;

using a gear system, and reorienting the rotational movement to be about an axis orthogonal to the longitudinal axis;

driving at least three split gears, the split gears having respective rotational axes offset laterally from one another and generally orthogonal to the longitudinal axis, wherein the at least three split gears are driven by a pinion gear of the gear system, wherein the pinion gear is configured to mesh with both the upper and lower gears of at least one of the at least three split gears;

producing linear movement in at least three sliding members extending away from the prime mover; wherein each split gear is mechanically coupled via a connecting rod to a corresponding sliding member; and suctioning and discharging the fluid with the linear movement.

19. The method of claim 18, wherein driving the at least three of split gears comprises driving a first split gear which induces rotational movement in a second split gear and a third split gear.

20. The method of claim 18, wherein the at least three of split gears are driven at a reduced angular speed as compared to the gear system.

* * * * *